US005469569A

United States Patent [19]

Grube et al.

[11] Patent Number: 5,469,569

[45] Date of Patent: Nov. 21, 1995

[54] METHOD FOR DETECTING UNAUTHORIZED MODIFICATION OF A COMMUNICATION OR BROADCAST UNIT

[75] Inventors: Gary W. Grube, Palatine; Timothy W. Markison, Hoffman Estates, both of Ill.

[73] Assignee: Motorola, Inc., Schaumburg, Ill.

[21] Appl. No.: 106,020

[22] Filed: Aug. 13, 1993

Related U.S. Application Data

[63] Continuation of Ser. No. 23,298, Feb. 26, 1993.

[51] Int. Cl.$^6$ .......... G06F 12/14

[52] U.S. Cl. .......... 395/600; 364/284.3; 364/286.4; 364/282.1; 364/DIG. 1

[58] Field of Search .......... 395/800, 600, 395/575; 364/403; 380/4, 25; 379/58

[56] References Cited

U.S. PATENT DOCUMENTS

| | | | |
|---|---|---|---|
| 4,791,565 | 12/1988 | Dunham | 380/4 |
| 4,845,715 | 7/1989 | Francisco | 371/53 |
| 4,928,098 | 5/1990 | Dannhaeuser | 340/825.56 |
| 5,117,222 | 5/1992 | McCurdy | 340/573 |
| 5,289,372 | 2/1994 | Guthrie | 364/403 |
| 5,337,345 | 8/1994 | Cassidy | 379/58 |
| 5,371,692 | 12/1994 | Draeger | 364/580 |

*Primary Examiner*—Eric Coleman
*Attorney, Agent, or Firm*—Daniel C. Crilly; Timothy W. Markison

[57] ABSTRACT

A database unit monitors the communications occurring within at least one communication system for a change status indicator of communication or broadcast units. Upon receiving the change status indicator, the database unit compares the one received with a stored change status indicator for the unit. When the stored change status indicator does not match the one received, the database unit indicates that the unit has undergone an unauthorized modification.

18 Claims, 2 Drawing Sheets

METHOD FOR DETECTING UNAUTHORIZED MODIFICATION OF A COMMUNICATION OR BROADCAST UNIT

This is a continuation of co-pending patent application having a Ser. No. of 08/023,298, filed on Feb. 26, 1993, and entitled "Detection of Unauthorized Use of Software Applications in Processing Devices".

FIELD OF THE INVENTION

The present invention relates generally to communication systems and, in particular, to the detection of unauthorized modifications to communication or broadcast units.

BACKGROUND OF THE INVENTION

Land mobile radio communication systems and cellular radio/telephone communication systems (communication systems) are known to include a plurality of communication units, a limited number of communication resources, broadcast units, and a resource controller. Communication units, which may be portable, mobile, or cellular radio/telephones, communicate voice or data information to other communication units or landline communication units via a communication resource and a broadcast unit. For a communication unit to be allocated a communication resource, the communication unit sends a request to the resource controller, wherein the request indicates that a communication resource is desired and what it is desired for. For example, if a communication unit in a trunked communication system desires to place a talk group call, the request will contain the communication unit's individual identification code and a message indicating that the communication resource is needed for the talk group call. Upon receiving the request, the resource controller processes it by determining whether the communication unit is a registered user of the communication system and whether the communication unit can request a talk group call. When the resource controller answers both of these questions in the positive, a communication resource is allocated to the communication unit for the talk group call.

The communication unit may request many other features that a communication system offers. For example, the communication unit may request interconnection calls (i.e. a telephone call through a public telephone switching network), private calls within the communication system, data transmissions, such as a facsimile transmission, secure transmissions, and many other special services. Each of these features are offered to subscribers (users of a communication unit) of a communication system for a fee. As would be expected to provide all, or even a few, of these features, a communication unit is a complexed piece of equipment composed of several operational platforms, modules, and/or printed circuit boards.

In an effort to save research and development (R & D) funds, a less scrupulous manufacturer might be inclined to take the operational platforms, or the circuitries contained thereon, from reputable manufacturers and use them in their own products. In addition, the less scrupulous manufacturer may offer services, without the authorization of a reputable manufacturer, to subscribers that upgrade a communication unit having a limited set of special features to a communication unit that offers substantially all of the special features available. In either case, the less scrupulous manufacturer can offer identical products, or upgrade services, at a lower price than the reputable manufacturers because it didn't have the R & D expenses. Thus, taking market share away from the reputable manufacturers.

In addition to taking market sham away for communication units, the less scrupulous manufacturer may also take operational platforms, or the circuitries contained thereon, of a broadcast unit of the reputable manufacturer. With the operational platforms, or the circuitries, of broadcast units, the less scrupulous manufacturer can offer an entire communication system at a reduced price. Thus, take further market share away from the reputable manufacturer. In order to minimize the market share loss, many reputable manufacturers protect their products, including communication and/or broadcast units, by obtaining patent and copyright protection.

While patent and copyright protection offer a substantial amount of protection, detecting infringement of these fights is difficult. Many manufacturers discover that one of their patented or copyrighted products has been infringed through advertisements of competitors, from customers, or from their sales force. Each of these methods are limited in that the manufacturer is reliant on informants to discover the infringement. In essence, these methods don't offer an active way of discovering infringement. Therefore, a need exists that allows manufacturers, especially those that manufacture communication and/or broadcast units, to actively detect when their patented and/or copyrighted products have been infringed.

SUMMARY OF THE INVENTION

Generally, the present invention provides a method for detecting unauthorized modifications of a communication, or broadcast, unit. This is accomplished by having the communication, or broadcast, unit detect whether it has been modified. If the unit has been modified, it generates a changed status message which is transmitted to a database unit, via a receiver, either upon the event or at a predetermined time interval. Upon receiving the changed status message, the database unit accesses a database to retrieve a stored change status message for the unit and compares them. When the transmitted changed status message does not match the stored change status message, the database unit identifies the communication unit as one that has undergone an unauthorized modification. With this method, a manufacturer of communication, or broadcast, units is provided an active means for detecting when their patented and/or copyrighted products have been modified without authorization.

DESCRIPTION OF THE PREFERRED EMBODIMENT

Figure 1:
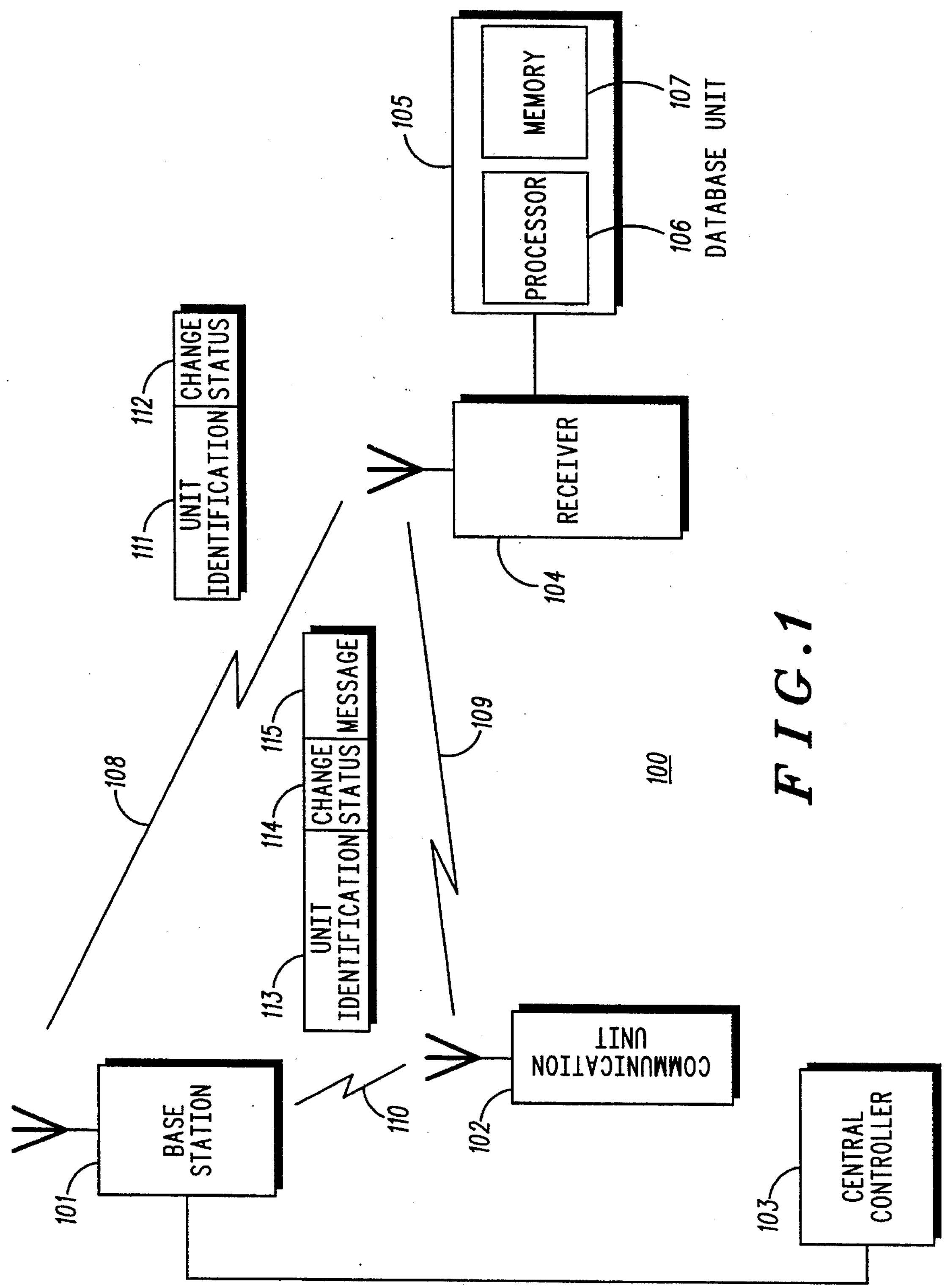
FIG. 1 illustrates a communication system, equipped with a database unit, in accordance with the present invention.
Figure 2:
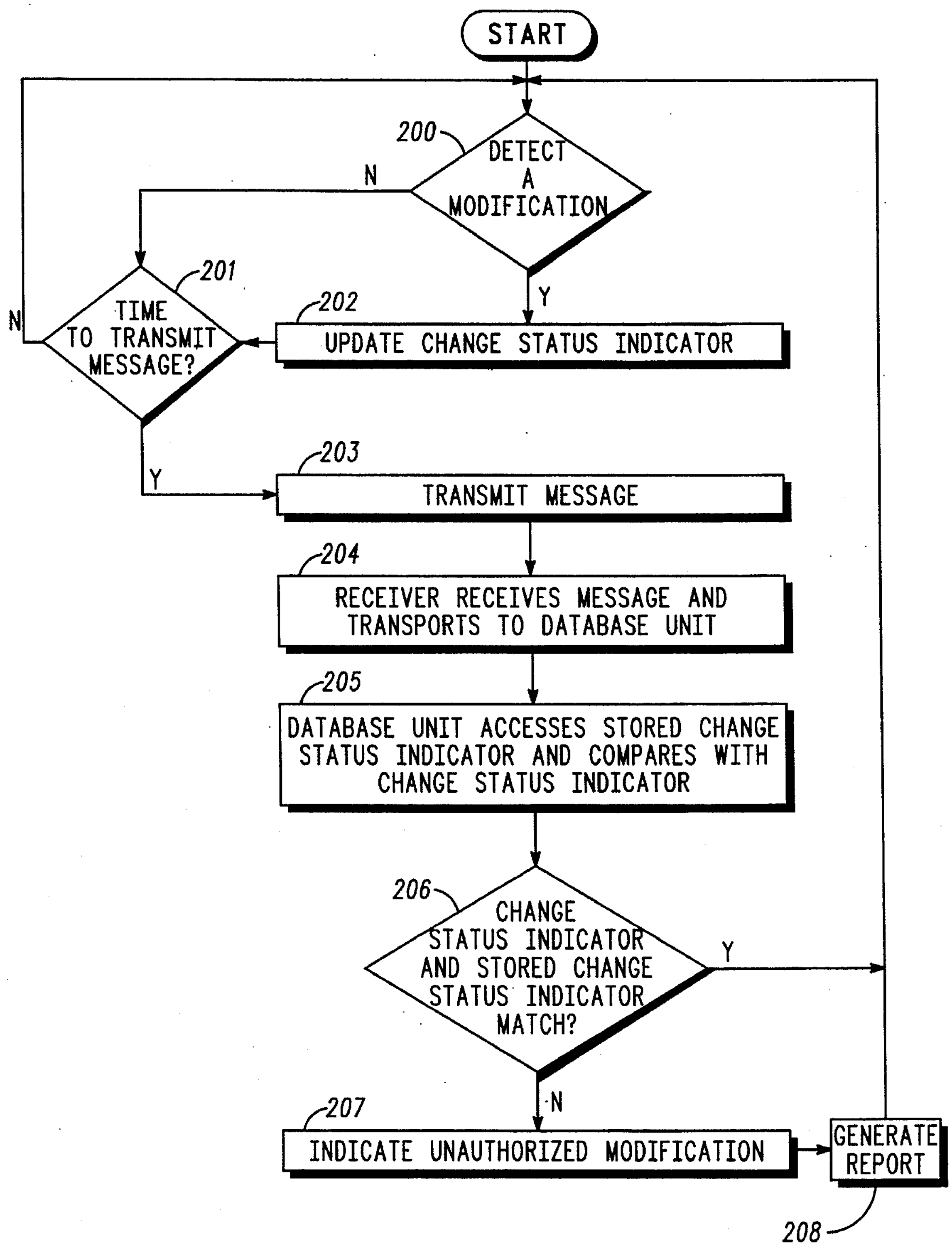
FIG. 2 illustrates a logic diagram that may be used to implement the present invention to detect the unauthorized modification of a communication or broadcast unit.

The present invention can be more fully described with reference to FIGS. 1–2. FIG. 1 illustrates communication system 100 that includes a plurality of broadcast units 101 (only one shown), a plurality of communication units 102 (only one shown), a central controller 103, a receiver 104, a database unit 105, and a limited number of communication resources 108–110. The communication unit 102, which may be portable, mobile, or cellular radio/telephone, monitors whether it has been changed and transmits a changed status message to the database unit in one of three ways. The first way is during normal communicate of voice or data information and is achieved by modifying an inbound signaling word (ISW). The ISW, as in prior art communication systems, contains a field for the communication unit's individual identification code 113 and a field for a message 115, and is now modified to include a field for a change status message 114. The second way is to transmit a special message to the database unit 105, wherein the special message includes the communication unit's individual identification code 111 and a change status message 112 when a change has occurred. The third way is to send the same special message, but at a predetermined time. Each of these methods will be described in detail below.

The broadcast unit 101, which may be a repeater and/or base station, like the communication unit 102, monitors whether it has been changed and transmits a changed status message to the database unit 105 in one of three ways. The first way is during normal communicate of voice or data information and is achieved by modifying a retransmitted ISW. (Note that broadcast units 101 typically function to convey information among the communication units 102 and the central controller 103) The retransmitted ISW is modified to include a field for a change status message, which may be the same type of field as the change status message field 114 of the communication unit. The second way is to transmit a special message to the database unit 105, wherein the special message includes the broadcast unit's individual identification code and a change status message when a change has occurred. The third way is to send the same special message, but at a predetermined time. As with the communication unit's methods, each of these methods will be described in detail below.

The database unit 105 receives information from the receiver 104, wherein the receiver may be a communication unit that is coupled to the database unit 105. The database unit 105, which may be a personal computer that has the capabilities to store large amounts of data (in excess of 100 Mbytes), includes memory 107 and a processing device 106. The memory 107 is arranged into a database that has a unit identification code (one for communication units and one for broadcast units) field and a stored change status message field. Each of these fields are controlled by the manufacturer of the units to provide accurate information of the change status of the communication units 102 and broadcast units 101. As is many databases, the unit identification code may be a hexadecimal number, or any number system, that is assigned by the manufacturer and is unique to the communication unit or broadcast unit. Likewise, the change status message may be a hexadecimal number, or a single binary bit, where 0 indicates no change and 1 indicates a change.

Having defined the elements of the communication system 100, the basic operation of the system, incorporating the present invention, may be described with reference to FIG. 2. Note that throughout the discussion regarding FIG. 2, a unit refers to either a communication unit or a broadcast unit. At step 200, the unit determines whether a modification has occurred. A modification may be detected by a tamper detection circuit which detects whether an attempt was made to open the unit, or a modification may be detected when software is changed within the unit. To the unit, any modification detected will be reported to the database unit (discussed below), but the modification is only unauthorized if the manufacture wasn't aware of the modification. Thus, normal service repairs will not cause a problem because the database unit can be updated to indicate the upcoming change.

If a change has occurred 200, the unit updates a status change indicator 202. The status change indicator is based on the format of the change status message, which has already been discussed. If a change is not detected 200, or after the change status indicator has been updated 202, the unit determines whether it is time to transmit a status change message to the database unit 201. As alluded to above, a unit may transmit the status change message to database unit in one of three ways. Before discussing these methods in detail, the change status message should be defined. The change status message is just as the name implies, a message to indicate that a change has occurred to the unit. The change status message may be a one-bit binary signal where 0 indicates no change and 1 indicates a change. Once the unit transmits this type of message, the message field is reset to the no change indicator. Alternatively, the change status message may be a running count of how many times the unit has been modified. Further, the change status message may indicate the type of modification. For example, if the tamper detection circuit became active due to a tampering, this could be indicated in the message, similarly, a software or hardware change could be indicated. As can be seen by one skilled in the art, the information contained in the status change message is just about limitless.

Referring back to three methods in which the unit may transmit the status change message, the first method requires the signaling protocol of the unit to be modified. The signaling protocol would be modified to include, in the ISW, a field for the status change message. In this method, every time the unit transmitted, or retransmitted, an ISW, the change status message would be transmitted. In order for the database unit to receive the change status message, the receiver needs to be positioned to receive the ISW. (Recall that the ISW is intended for the central controller such that the unit can receive some system service.) Thus, the unit determines to transmit the change status message every time it desires to transmit a normal communication system message. The second and third methods involve the unit generating a special message that contains the unit's identification code and the status change message. The difference between these two methods is when the special message is sent. In the second method, the special message is transmitted upon detection of the change, whereas the third method transmits the special message after a predetermined time interval has elapsed. The predetermined time interval may be any interval from one day to one month depending on how often an administrator would like the system monitored without needlessly bogging down the communication system. Note that the predetermined time interval need not be the same for each unit.

When it is time to transmit the change status message 201, the message is transmitted 203. The transmission of the message will be over an radio frequency (RF) channel such that it is readily receivable by the receiver. Upon receiving the message, the receiver transports the message to the database unit 204. The transportation of the message depends on the type of interconnection between the receiver and the database unit. For example, if the connection is an RF connection, the transportation will be over an RF channel. Note that there may be a plurality of receivers providing messages to the database unit, where the plurality of receivers are positioned throughout several communication systems.

Once the database unit has the special message, which contains the unit's identification code and the change status message or indicator, 204, the database unit accesses a database to retrieve a stored change status indicator for the unit and compares the stored indicator with the received indicator 205. If the indicators substantially match 206, the process repeats at step 200. If, however, the indicators do not substantially match 206, the database unit indicates that an unauthorized modification has occurred 207. Recall that if the modification was authorized, the database unit would have been updated with that information. Having identified that the unit has undergone an unauthorized modification 207, a report is generated 208. The report may be generated by a printer or similar device. Once the report is generated, the database unit resets the stored change status indicator for the unit and the process repeats at step 200.

It is understood that the procedures described above can be modified to perform the monitoring on an even more active basis. That is, rather than the database unit only monitoring communications as they occur, it can also transmit requests for information to the communication and broadcast units. When the requested information is provided to the database unit, the process of detecting unauthorized modification continues as described above.

The present invention provides a method for detecting when a communication or broadcast unit has undergone an unauthorized modification. With such a method, a database unit can determine, in an active manner, when a unit has been modified. This is accomplished by comparing a changed status message transmitted by the unit with one that is stored in the database unit. If the changed status messages do not match, the database unit indicates that the unit has undergone an unauthorized modification. Thus, the manufacturers of communication units and broadcast units can actively determine when their products have been modified, or infringed, as opposed to the passive informant means of prior art detection methods.

We claim:

1. In a communication system that includes a plurality of communication units and at least one radio frequency communication resource, a method of detecting an unauthorized modification of a communication unit of the plurality of communication units, the method comprises the steps of:

a) transmitting, by the communication unit via the radio frequency communication resource, at a predetermined time interval, a message, wherein the message comprises a communication unit ID and a software change status indicator;

b) receiving, by a receiver via the radio frequency communication resource, the message, thus forming a received message;

c) transporting, by the receiver, the received message to a database unit;

d) accessing, by the database unit, a stored software change status indicator based on the communication unit ID;

e) comparing, by the database unit, the software change status indicator with the stored software change status indicator; and f) when the software change status indicator and the stored software change status indicator do not substantially match, indicating, by the database unit, that an unauthorized modification to the communication unit occurred.

2. In the method of claim 1, the software change status indicator of step (a) further comprises, incrementing a count of the number of modifications that has occurred to the communication unit.

3. In the method of claim 1, the software change status indicator of step (a) further comprises, indicating that a modification has occurred to the communication unit.

4. The method of claim 1 further comprises the step of:

g) when the unauthorized modification to the communication unit has occurred, generating, by the database unit, a report indicating the unauthorized modification has occurred to the communication unit.

5. The method of claim 1 further comprises the step of:

g) resetting, by the database unit, the stored software change status indicator.

6. In a communication system that includes at least one base station and at least one radio frequency communication resource, a method of detecting an unauthorized modification of a base station, the method comprises the steps of:

a) transmitting, by the base station via the radio frequency communication resource, at a predetermined time interval, a message, wherein the message comprises a base station ID and a software change status indicator;

b) receiving, by a receiver via the radio frequency communication resource, the message, thus forming a received message;

c) transporting, by the receiver, the received message to a database unit;

d) accessing, by the database unit, a stored software change status indicator based on the base station ID;

e) comparing, by the database unit, the software change status indicator with the stored software change status indicator; and f) when the software change status indicator and the stored software change status indicator do not substantially match, indicating, by the database unit, that an unauthorized modification to the base station occurred.

7. In the method of claim 6, the software change status indicator of step (a) further comprises, incrementing a count of the number of modifications that has occurred to the base station.

8. In the method of claim 6, the software change status indicator of step (a) further comprises, indicating that a modification has occurred to the base station.

9. The method of claim 6 further comprises the step of:

g) when the unauthorized modification to the base station has occurred, generating, by the database unit, a report indicating the unauthorized modification has occurred to the base station.

10. The method of claim 6 further comprises the step of:

g) resetting, by the database unit, the stored software change status indicator.

11. In a communication system that includes a plurality of communication units and at least one radio frequency communication resource, a method of detecting an unauthorized modification of a communication unit of the plurality of communication units, the method comprises the steps of:

a) determining, by the communication unit, that a modification has occurred to the communication unit;

b) when the modification has occurred to the communication unit, transmitting, by the communication unit via the radio frequency communication resource, a message, wherein the message comprises a communication unit ID and a software change status indicator;

b) receiving, by a receiver via the radio frequency communication resource, the message, thus forming a received message;

c) transporting, by the receiver, the received message to a database unit;

d) accessing, by the database unit, a stored software change status indicator based on the communication unit ID;

e) comparing, by the database unit, the software change status indicator with the stored software change status indicator; and f) when the software change status indicator and the stored software change status indicator do not substantially match, indicating, by the database unit, that an unauthorized modification to the communication unit occurred.

12. The method of claim 11 further comprises the step of:

h) when the unauthorized modification to the communication unit has occurred, generating, by the database unit, a report indicating the unauthorized modification has occurred to the communication unit.

13. In a communication system that includes at least one base station and at least one radio frequency communication resource, a method of detecting an unauthorized modification of a base station, the method comprises the steps of:

a) determining, by the base station, that a modification has occurred to the base station;

b) when the modification has occurred to the base station, transmitting, by the base station via the radio frequency communication resource, a message, wherein the message comprises a base station ID and a software change status indicator;

b) receiving, by a receiver via the radio frequency communication resource, the message, thus forming a received message;

c) transporting, by the receiver, the received message to a database unit;

d) accessing, by the database unit, a stored software change status indicator based on the base station ID;

e) comparing, by the database unit, the software change status indicator with the stored software change status indicator; and f) when the software change status indicator and the stored software change status indicator do not substantially match, indicating, by the database unit, that an unauthorized modification to the base station occurred.

14. The method of claim 3 further comprises the step of:

h) when the unauthorized modification to the base station has occurred, generating, by the database unit, a report indicating the unauthorized modification has occurred to the base station.

15. In a communication system that includes a plurality of communication units and at least one radio frequency communication resource, a method of detecting an unauthorized modification of a communication unit of the plurality of communication units, the method comprises the steps of:

a) transmitting, by the communication unit via the radio frequency communication resource, a message, wherein the message comprises a communication unit ID, a resource request and a software change status indicator;

b) receiving, by a receiver via the radio frequency communication resource, the message, thus forming a received message;

c) transporting, by the receiver, the received message to a database unit;

d) accessing, by the database unit, a stored software change status indicator based on the communication unit ID;

e) comparing, by the database unit, the software change status indicator with the stored software change status indicator; and f) when the software change status indicator and the stored software change status indicator do not substantially match, indicating, by the database unit, that an unauthorized modification to the communication unit occurred.

16. The method of claim 15 further comprises the step of:

g) when the unauthorized modification to the communication unit has occurred, generating, by the database unit, a report indicating the unauthorized modification has occurred to the communication unit.

17. In a communication system that includes at least one base station and at least one radio frequency communication resource, a method of detecting an unauthorized modification of a base station, the method comprises the steps of:

a) transmitting, by the base station via the radio frequency communication resource, a message, wherein the message comprises a base station ID, a resource request and a software change status indicator;

b) receiving, by a receiver via the radio frequency communication resource, the message, thus forming a received message;

c) transporting, by the receiver, the received message to a database unit;

d) accessing, by the database unit, a stored software change status indicator based on the base station ID;

e) comparing, by the database unit, the software change status indicator with the stored software change status indicator; and f) when the software change status indicator and the stored software change status indicator do not substantially match, indicating, by the database unit, that an unauthorized modification to the base station occurred.

18. The method of claim 17 further comprises the step of:

g) when the unauthorized modification to the base station has occurred, generating, by the database unit, a report indicating the unauthorized modification has occurred to the base station.

* * * * *

UNITED STATES PATENT AND TRADEMARK OFFICE

CERTIFICATE OF CORRECTION

PATENT NO. : 5,469,569

DATED : November 21, 1995

INVENTOR(S) : Gary W. Grube and Timothy W. Markison

It is certified that error appears in the above-indentified patent and that said Letters Patent is hereby corrected as shown below:

Column 7, line 44,

Claim 14 should be dependent upon claim --13-- instead of claim "3".

Signed and Sealed this

Twenty-third Day of April, 1996

Attest:

BRUCE LEHMAN

Attesting Officer

Commissioner of Patents and Trademarks